INVENTORS
JÖNS KURT ALVAR OLSSON
SVEN ARNE OLSSON,
BY Hane and Nydick
ATTORNEYS

INVENTORS
JÖNS KURT ALVAR OLSSON
SVEN ARNE OLSSON
BY Kane and Nydick
ATTORNEYS

INVENTORS
JÖNS KURT ALVAR OLSSON
SVEN ARNE OLSSON
BY Hane and Nydick
ATTORNEYS

United States Patent Office 3,311,899
Patented Mar. 28, 1967

3,311,899
METHOD OF WRITING-IN AND NON-ERASING READING OF BINARY INFORMATION IN MAGNETIC RING CORES

Jöns Kurt Alvar Olsson, Tullinge, and Sven Arne Olsson, Ekholmen, Alvsjo, Sweden, assignors to Telefonaktiebolaget L M Ericsson, Stockholm, Sweden, a corporation of Sweden Filed Sept. 29, 1960, Ser. No. 57,175
Claims priority, application Sweden, Oct. 19, 1959, 9,685/59
2 Claims. (Cl. 340—174)

The present invention relates to a method of non-erasing reading of binary information in magnetic ring cores arranged in matrix form and formed of a material with marked remanence- and saturation qualities.

Methods are known where the writing-in of binary information of a special kind, for instance "0"-information, is effected by impressing a magnetizing impulse on the ring cores, in the following called zero adjustment impulse, with sufficient duration and amplitude for magnetizing the cores to remanence value with strong saturation qualities, and writing-in of binary information of the opposite kind, "1"-information, in certain ring cores is effected by demagnetizing of said certain ring cores to a value, the magnitude of which differs from the magnitude of said remanence value reading-out of the written-in information is effected by the ring cores being exposed to two each other following magnetizing impulses, in the following called reading impulses, of mutually different polarity and an amplitude, which is essentially below the amplitude of the zero adjustment impulse.

If the writing-in occurs by coincident feeding of a reading impulse on one line and a damped sinusoidal current on a column in a matrix of ring cores, the drawback arises that the writing-in will take a rather long time owing to the fact that the damped sinusoidal current must have a damping time, which is much longer than the time between two each other following reading impulses.

The purpose of the present invention is to eliminate said drawback. The method according to the invention is characterized thereby that the mentioned writing-in of binary information of the opposite kind is effected by said certain ring cores being first impressed with a magnetizing impulse of the opposite polarity of the zero adjustment impulse and with an amplitude, which is substantially smaller than the amplitude of the zero adjustment impulse but essentially larger than the amplitude of the reading impulse, and then being impressed with an impulse of the same polarity as the polarity of the zero adjustment impulse and with an amplitude which is equal to the amplitude of the reading impulses.

Figures 1, 2:
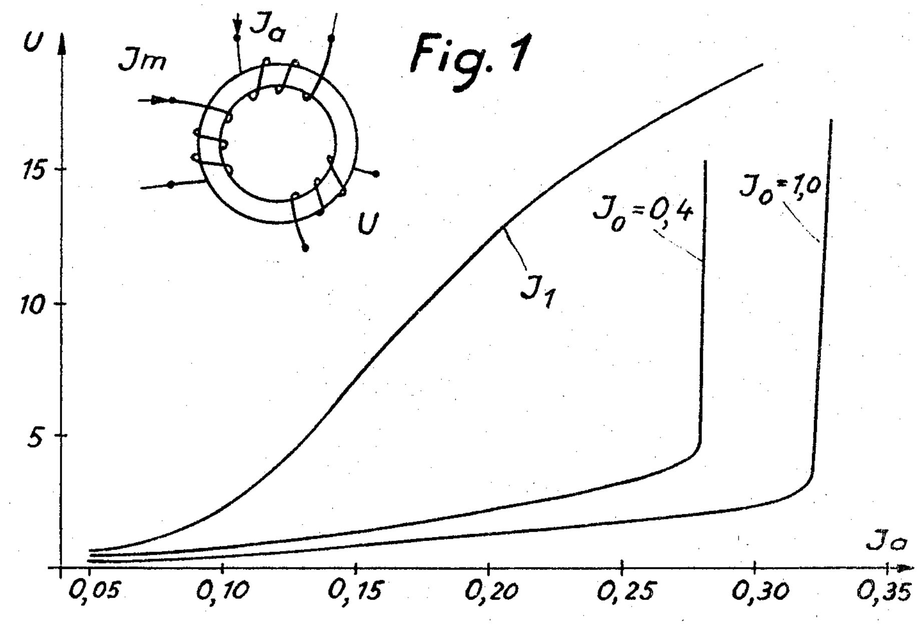
Figure 3:
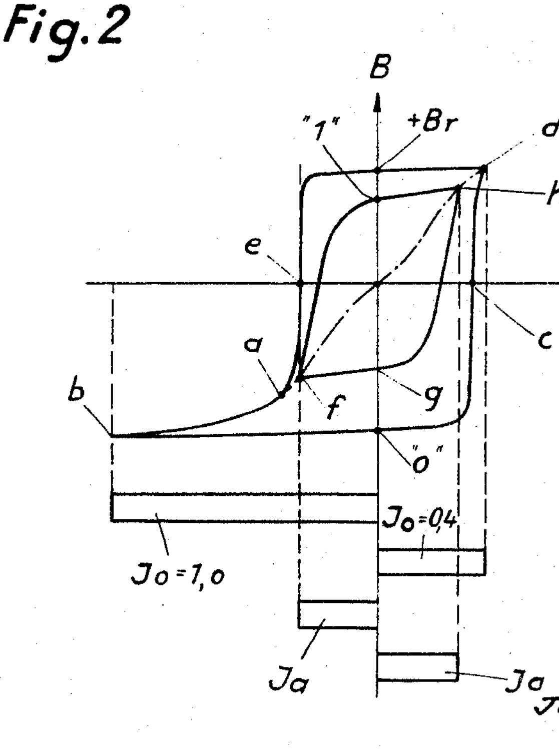

The invention will be further described in connection to the drawings, where FIG. 1 schematically shows a ring core with its windings, FIG. 2 shows the initial voltage U from the ring core according to FIG. 1 as a function of varying reading voltage I*a* at different magnetizing current I*m* ((1) I*m*≈0, that is, demagnetized core; (2) I*m*=I*o*=0.4; (3) I*m*=I*o*=1.0), FIG. 3 shows the flow density B as a function of the field strength H at different magnetizing conditions at the ring core according to FIG. 1, FIG. 4 shows an arrangement for carrying out the method according to the invention with a number of ring cores arranged in matrix form, FIGS. 5–8 show current diagrams for the arrangement according to FIG. 4, FIGS. 9–12 show current diagrams for a first modification of the arrangement according to FIG. 4, and FIGS. 13–16 show current diagrams for a second modification of the arrangement according to FIG. 4.

The ring core according to FIG. 1 has a magnetizing winding for the magnetizing current I*m*, a reading winding for the reading current I*a* and an output winding over which the output voltage U is obtained. If the magnetizing current I*m* in the beginning is ≈0, that is the core is demagnetized, a reading current I*a*, in the form of an impulse, will give rise to a pulse formed output voltage U, the amplitude of which appears from the curve $I_1$ in FIG. 2. If the amplitude of the magnetizing current I*m* is substantially increased the function between U and I*a* will alter its character so that a marked knee-curve is obtained. In FIG. 2 the case is shown where a magnetizing current I*m*=I*o*=0.4 ampere causes a strong rise of the output voltage U at I*a* about 0.28 ampere while I*m*=I*o*=1.0 ampere gives a corresponding rise at I*a* about 0.32 ampere; the symbol I*o* is here used to indicate the character of zero adjustment current to magnetizing currents of this magnitude. In the following it will be shown how the mentioned difference in the knee values for a magnetic material can be used to reduce the time necessary for the reading of the "I" information.

A ring core is first impressed a zero adjustment impulse with sufficient duration and amplitude for magnetizing the core to a remanence value with strong saturation qualities. In FIG. 3 such a zero adjustment impulse is represented by the symbol I*o*=1.0; the zero adjustment impulse shifts the magnetizing condition of the ring core to the outer position *b* on the magnetizing curve and when the impulse stops the core is magnetized to the remanence value "0." After this the ring core is first impressed with a magnetizing impulse I*o*=0.4, that is, an impulse of a polarity opposite to the polarity of the zero adjustment impulse and with an amplitude which is smaller than the amplitude of the zero adjustment impulse. This second magnetizing impulse shifts the magnetizing condition of the core to the outer position *d*, and when the impulse stops the core is magnetized to the remanence value +B*r*, the absolute amount of which is essentially smaller than the absolute amount of the first mentioned remanence value ("0"). After that the ring core is impressed with an impulse I*a* of the same polarity as the polarity of the zero adjustment impulse (*Io*=1.0) and with an amplitude which is substantially smaller than that of the zero adjustment impulse and of the amplitude of the second magnetizing impulse. More exactly, the amplitude of the impulse I*a* is chosen to a value which lies between the two knee values, shown in FIG. 2, *Ia*=0.28 and *Ia*=0.32, viz 0.3. This impulse I*a* shifts the magnetizing condition of the core to the position *f* on an inner loop *f*–*g*–*h*–"1"–*f*, which loop can be said to represent the binary information "1." When the impulse stops, the core is magnetized to the remanence value *g*, the absolute amount of which is essentially smaller than the absolute amount of "0" as well as "+B*r*." A second impulse I*a* of opposite polarity to the first mentioned shifts the magnetizing condition of the core over *h* to "1." Said two impulses I*a* together form the reading impulses, mentioned in the foregoing, that is, for writing-in of the information "1" the magnetizing impulse *Io*=0.4 is used and also a reading impulse I*a*, or possibly both the reading impulses. The mentioned method is more safe the greater the difference is between the knee-values shown in FIG. 2.

Figure 4:
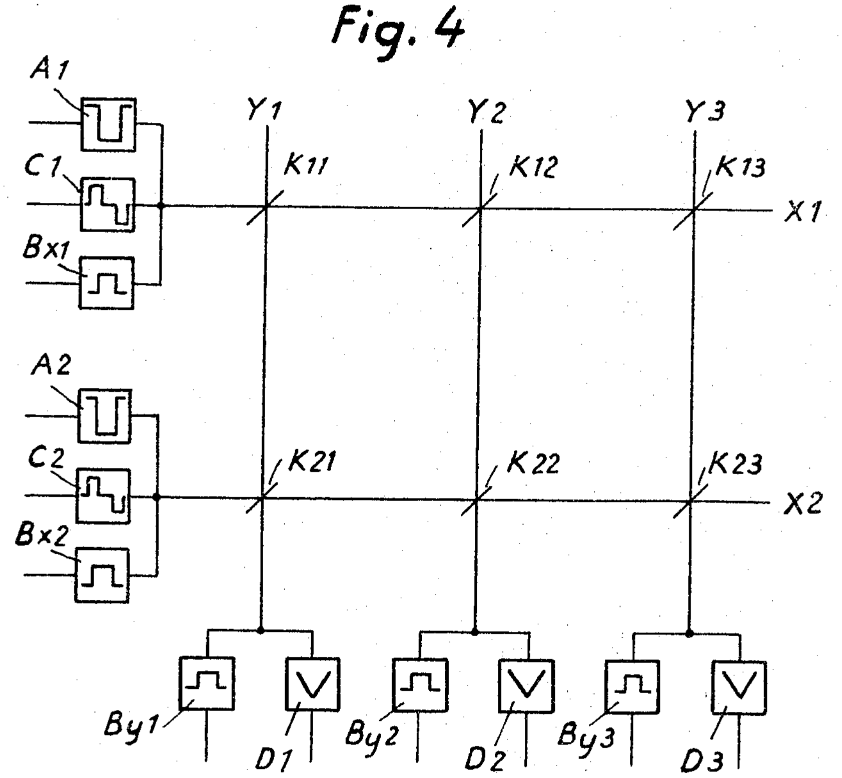
Figure 5:
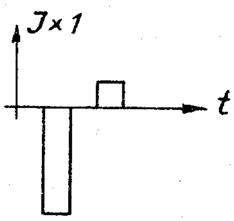
Figure 7:
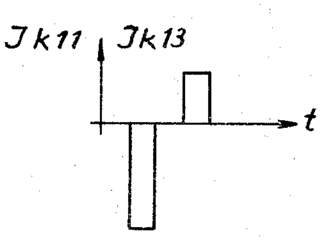
Figure 6:
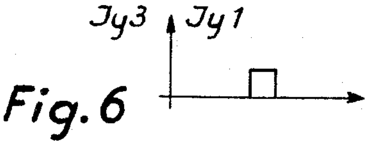
Figure 8:
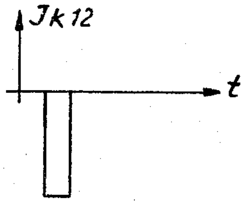
Figure 9:
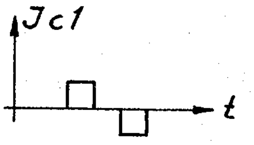
Figure 11:
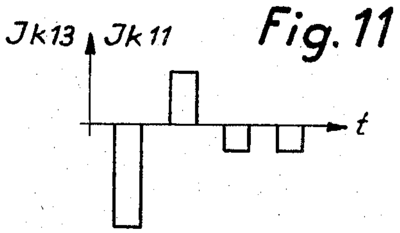
Figure 10:
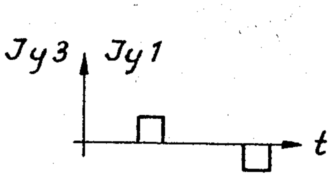
Figure 12:
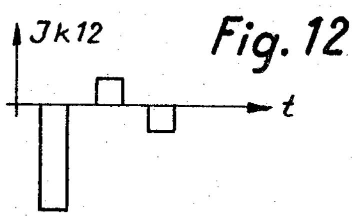
Figures 13, 14:
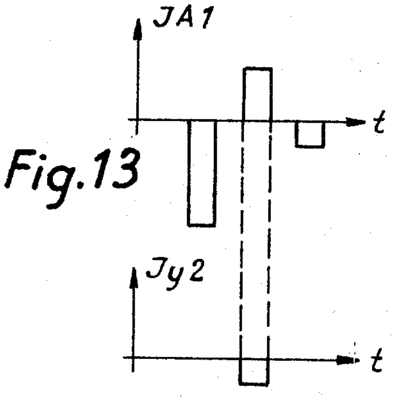
Figure 15:
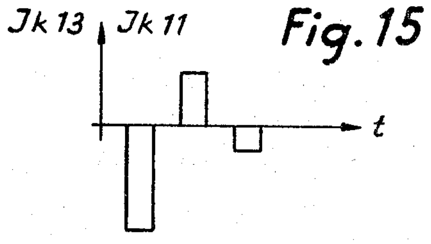
Figure 16:
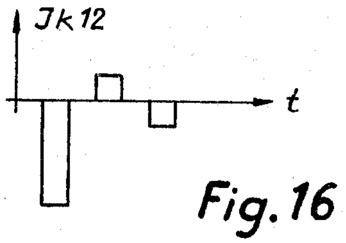

FIG. 4 shows schematically how the method according to the invention can be applicable to a number of ring cores arranged in matrix form. The cores K11, K12 . . . K23 are arranged in two lines X1, X2 and three columns Y1, Y2, Y3. For the line X1 with the cores K11, K12, K13 there is arranged a zero adjustment circuit A1, a writing-in circuit B*x*1 and a reading circuit C1. For the line X2 with the cores K21, K22, K23 corresponding units A2, B*x*2 and C2 are provided. For the column Y1 with the cores K11, K21 a writing-in circuit B*y*1 and an indicating circuit D1 are arranged. For the lines Y2 and Y3 with the cores K12, K22 resp. K13, K23 corresponding units By2, D2 resp. By3, D3 are arranged. If for instance the program "1" "0" "1" shall be written-in in the line X1, a negative zero adjustment impulse is first fed from the circuit A1, that is, the cores K11, K12, K13 are magnetized to the remanence value "0" with a corresponding knee-value $Ia=0.32$ ampere, see FIG. 2. The writing-in of "1" in the cores K11, K13 occurs then by coincident feeding of writing-in impulses from Bx1, and By1, By3. The total current Ix1 in the line X1 is clear from FIG. 5, and the total current Iy1 and Iy3 respectively in the columns Y1, Y3 is clear from FIG. 6. The current Ik11 and Ik13 respectively through the cores K11 and K13 is evidently obtained by superimposing the diagrams in FIGS. 5 and 6, see FIG. 7, while the current Ik12 in the core K12 is determined only by the zero adjustment impulse from the circuit A1, see FIG. 8. Consequently the result up to now is that the cores K11 and K13 are magnetized to the remanence value +Br, see FIG. 2, with a corresponding knee-value $Ia=0.28$, while the core K12 is still magnetized to the remanence value "0." If then from the reading circuit C1 to the line X1 two reading impulses $Ia=0.3$ ampere are fed, the cores K11 and K13 are shifted to the remanence point "1," while the core K12 remains at the remanence point "0." It may be mentioned here that the whole inner loop *f–g–h–*"1" represents the information "1," although owing to the co-operation of the reading-impulses it is justified to call just the upper remanence point of the loop "1" as "1"-set cores during the times when reading occurs are shifted to this point on the magnetizing curve. At the following readings of the cores two reading impulses Ia are fed each time C1, and the result in this case "1" "0" "1" is indicated in the units D1, D2, D3. At each reading the "1"-set cores follow the inner loop "1"–*f–g–h*–"1."

It is evident that the units A, B, C can be dimensioned and arranged in many different ways without departing from the scope of the invention. In FIGS. 9–12 for instance, writing-in of the information "1" occurs by feeding the reading impulses from C1, see FIG. 9, and of two impulses with mutually different polarity from each one of the units By1, By3, see FIG. 10. The first impulses of said pair of impulses are coincident and the impulses from By1 resp. By3 have substantially larger impulse distance than the impulses from C1. The currents Ik11, Ik12, Ik13 through the cores are clear from the diagrams in FIGS. 11–12, in which even the negative zero adjustment impulse is shown in order to correspond to the diagrams in FIGS. 7–8. As shown the cores K11 and K13 will be shifted to the point *g* in the inner magnetizing loop as a result of the coincidence, see FIG. 3, while the core K12 remains in the remanence point "0."

A further modification is shown in FIGS. 13–16. The unit A1 is arranged to produce successively a zero adjustment impulse and a writing-in impulse of the opposite polarity to and with smaller amplitude than the zero adjustment impulse and also a further impulse of the same polarity as the zero adjustment impulse and with smaller amplitude than the writing-in impulse. The unit B2 is arranged to produce an impulse with the same polarity as the zero adjustment pulse; this single impulse is coincident with the mentioned writing-in impulse A1. The result is that the cores K11 and K13, which are influenced from A1, are shifted to the remanence position +Br and are indicating the information "1" after the feeding of reading impulses, while the core K12, which is influenced by A1 and B2, remains in the remanence position "0" and consequently is indicating just this information after the feeding of reading impulses.

We claim:

1. A method of writing-in and non-destructive reading binary information, said method comprising the steps of impressing upon each of several ring cores having high remanence and saturation characteristics a magnetizing pulse of a duration and amplitude effecting magnetization of said cores to a remanence value with high saturation characteristic, said pulse magnetizing the cores for zero setting and effecting writing-in of binary information of one kind, then impressing upon selected ones of said ring cores a magnetic pulse having a polarity opposite from that of the zero-setting pulse and an amplitude substantially lower than the amplitude of said zero-setting pulse, said second pulse magnetizing the selected cores to a remanence value lower than the remanence value caused by the first pulse and effecting writing-in of binary information of the other kind, and finally impressing upon said ring cores two magnetizing pulses in succession, the first one of said two pulses having the same polarity as the zero-setting pulse and an amplitude lower than the amplitudes of the zero-setting pulse and the second magnetizing pulse, and the second of said two pulses having a polarity opposite to that of the zero-setting pulse, said two successive pulses constituting read-out pulses.

2. A method of writing-in and non-destructive reading of binary information, said method comprising the steps of impressing upon each of several ring cores having high remanence and saturation characteristics a first magnetizing pulse of a duration and amplitude effecting magnetization of said cores to a remanence value with high saturation characteristic, effecting writing in of binary information of one kind; then for effecting writing in of binary information of the other kind, impressing upon selected ones of said ring cores a second magnetic pulse having a polarity opposite to that of the first pulse and an amplitude substantially lower than the amplitude of said first pulse, said second pulse magnetizing the selected cores to a remanence value lower than the remanence value caused by the first pulse, and finally impressing upon said ring cores third and fourth magnetizing pulses in succession, the third pulse having the same polarity as the first pulse and an amplitude lower than the amplitudes of the first and second pulses, and the fourth pulse having a polarity opposite to that of the first pulse and an amplitude lower than the amplitudes of the first and second pulses, said third and fourth successive pulses being thereafter usable for read-out pulses.

References Cited by the Examiner

UNITED STATES PATENTS

| | | | |
|---|---|---|---|
| 2,856,596 | 10/1958 | Miller | 340—174 |
| 2,898,580 | 8/1959 | Kelly | 340—174 |
| 2,985,867 | 5/1961 | Christensen | 340—174 |
| 3,017,614 | 1/1962 | Rajchman | 340—174 |

BERNARD KONICK, *Primary Examiner.*

JOHN F. BURNS, IRVING L. SRAGOW, JAMES W. MOFFITT, J. J. POSTA, *Assistant Examiner.*